United States Patent [19]

Wermelinger

[11] Patent Number: 4,830,410
[45] Date of Patent: May 16, 1989

[54] PIPE CONNECTING MEMBER OF PLASTICS MATERIAL

[75] Inventor: Jörg Wermelinger, Fislisbach, Switzerland

[73] Assignee: Georg Fischer AG, Schaffhausen, Switzerland

[21] Appl. No.: 105,107

[22] Filed: Oct. 5, 1987

[30] Foreign Application Priority Data

Oct. 31, 1986 [CH] Switzerland ............................ 04 331

[51] Int. Cl.⁴ ............................................. F16L 47/02
[52] U.S. Cl. .................................... 285/156; 285/179; 285/423
[58] Field of Search ................. 285/156, 179, 423, 178

[56] References Cited

U.S. PATENT DOCUMENTS

| | | | |
|---|---|---|---|
| 1,960,557 | 5/1934 | Snyder | 285/179 |
| 2,157,274 | 5/1939 | Williams | 285/156 |
| 2,670,224 | 2/1954 | Markl | 285/156 |
| 3,850,459 | 11/1974 | Blumenkranz et al. | 285/156 |
| 4,036,513 | 7/1977 | Loftus et al. | 285/179 |
| 4,440,712 | 4/1984 | Imgram | 138/109 X |
| 4,671,544 | 6/1987 | Ortloff | 285/334 |

FOREIGN PATENT DOCUMENTS

| | | | |
|---|---|---|---|
| 347050 | 7/1960 | Switzerland | 285/156 |
| 966386 | 10/1982 | U.S.S.R. | 285/156 |

*Primary Examiner*—Thomas F. Callaghan
*Attorney, Agent, or Firm*—Toren, McGeady & Associates

[57] ABSTRACT

A pipe connecting member of plastics material for pressurized fluid lines. The pipe connecting member has sleeve portions and a middle portion extending between and connecting the sleeve portions. The sleeve portions receive in a tightly sealed manner the pipes to be connected. The middle portion has an outer surface which is circular in cross-section. The middle portion has a wall thickness which changes continuously in circumferential direction and an inner surface with two inner surface area portions which extend eccentrically relative to the outer surface of the middle portion. The middle portion has the greatest wall thickness where it intersects the plane extending through the sleeve axes.

11 Claims, 2 Drawing Sheets

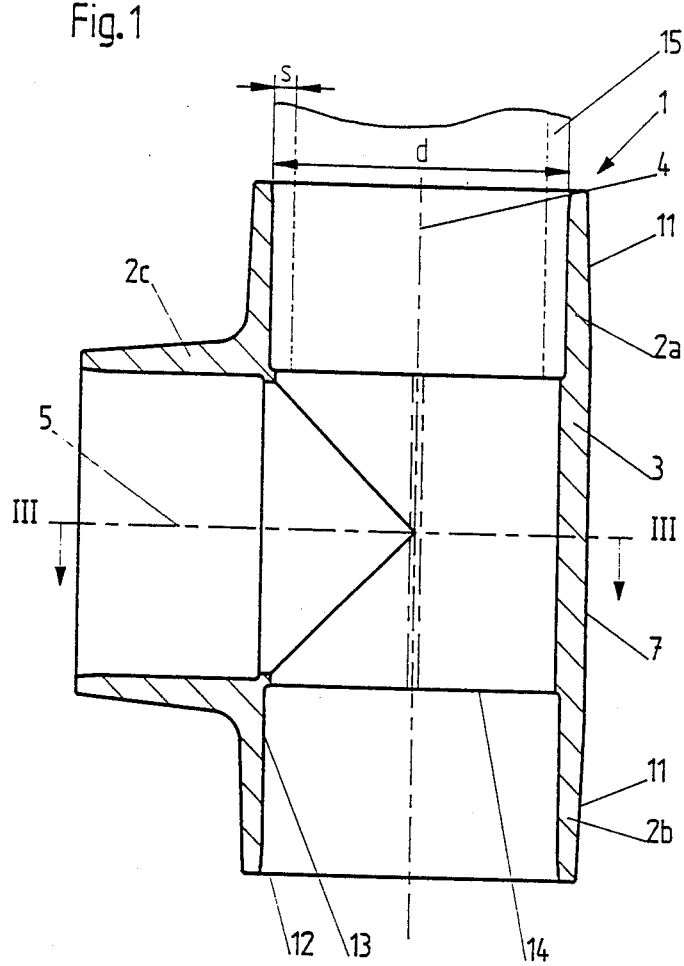
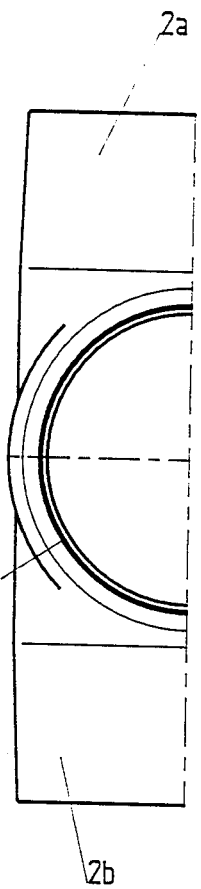
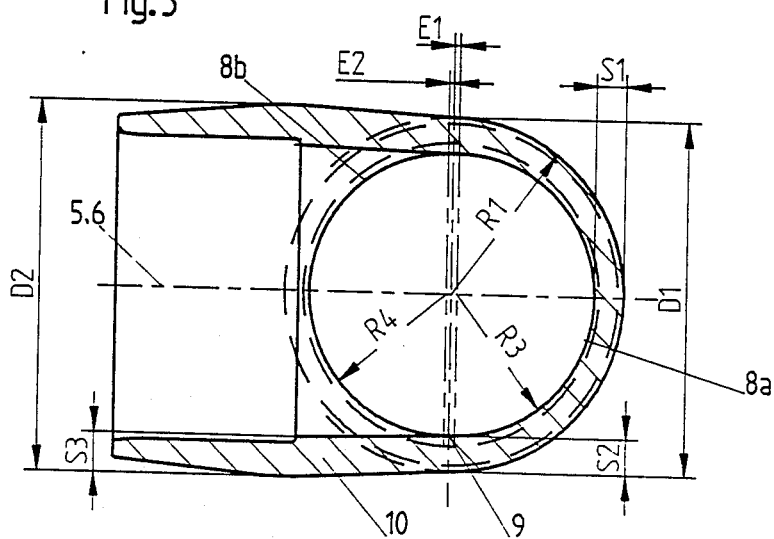

4,830,410

PIPE CONNECTING MEMBER OF PLASTICS MATERIAL

BACKGROUND OF THE INVENTION

1. Field of the Invention

The present invention relates to a pipe connecting member of plastics material for pressurized fluid lines. The pipe connecting member has sleeve portions and a middle portion extending between and connecting the sleeve portions. The pipes to be connected are received by the sleeve portions in a tightly sealed manner. The middle portion has an outer surface which is circular in cross-section.

2. Description of the Prior Art

DE-B-2,223,529 discloses pipe connecting members of the above-described type whose middle portion and whose transitions from the middle portions to the sleeve portions are especially reinforced at the outer surfaces thereof. The reinforcement arranged on the outer circumference means that in certain areas of the pipe connecting member more material is provided than is necessary for the required strength of the pipe connecting member. This results in substantial inhomogeneities of the injection material which, in turn, negatively influences the strength of the pipe connecting member. The pipe connecting members according to the above-mentioned German publication do not have reinforcements only in the critical areas, so that more material than is absolutely necessary is used in manufacturing these connecting members.

It is, therefore, the primary object of the present invention to provide pipe connecting members of the above-described type as injection molded articles in which the necessary strength is obtained by using as little material as possible, while all areas of the pipe connecting member are as uniformly stressed as possible under load. The outer surface of the pipe connecting member is to have a smooth shape and the pipe connecting member must have a structure suitable for injection molding in order to achieve a homogeneous material distribution in the pipe connecting member.

SUMMARY OF THE INVENTION

In accordance with the present invention, the middle portion of the pipe connecting member has a wall thickness which changes continuously in circumferential direction. The middle portion has an inner surface with two inner surface area portions, wherein the inner surface area portions extend eccentrically relative to the outer surface of the middle portion.

By providing reinforcing material at the inner surface of the middle portion of the pipe connecting member it is possible to partially strengthen the pipe connecting member at the critical locations, while requiring less material than would be needed if the outer surface were reinforced. At the same time, the inner surface area is reduced in size, so that, with equal internal pressure of the pressurized fluid, the load on the pipe connecting member becomes smaller which, in turn, means that less reinforcement is required and a more homogeneous injection molded member is obtained. By arranging the inner surface eccentrically relative to the outer surface of the middle portion of the pipe connecting member a steady transition of material from the thinnest wall thickness to the thickest wall thickness is obtained, so that pipe connecting members can be manufactured by injection molding, wherein the pipe connecting members have low internal tension.

The various features of novelty which characterize the invention are pointed out with particularity in the claims annexed to and forming a part of this disclosure. For a better understanding of the invention, its operating advantages and specific objects attained by its use, reference should be had to the drawings and descriptive matter in which there are illustrated and described preferred embodiments of the invention.

BRIEF DESCRIPTION OF THE DRAWINGS

In the drawing:

FIG. 1 is a sectional view of a T-type pipe connecting member;

FIG. 2 is a top view of the left-hand portion of the member shown in FIG. 1;

FIG. 3 is a sectional view taken along sectional line III—III of FIG. 1;

DETAILED DESCRIPTION OF THE INVENTION

Figure 4:
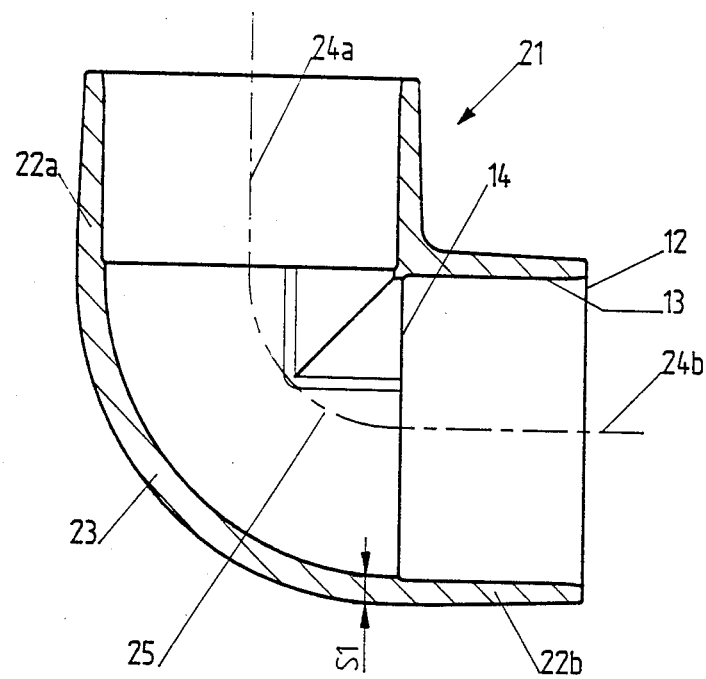
FIG. 4 is a sectional view of an angular pipe connecting member according to the present invention.

FIGS. 1 to 3 of the drawing show a pipe connecting member according to the present invention in the form of a T-shaped branch member 1. The pipe connecting member can be made of any suitable plastics material.

Branch member 1 has two oppositely arranged identical sleeve portions 2a, 2b and a sleeve portion 2c which branches off from sleeve portions 2a, 2b. All three sleeve portions are connected to each other by a middle portion 3. The two sleeve portions 2a, 2b are arranged concentrically to an axis 4 and sleeve portion 2c is arranged concentrically to axis 5 which extends perpendicularly to axis 4. A plane extending through axes 4 and 5 is denoted by reference numeral 6.

As can be seen in FIG. 3, the outer surface 7 of the middle portion of the branch member 1 is constructed circular in cross-section with a radius R1. The center point of radius R1 coincides with axis 4.

The inner surface 8 of the middle portion has two inner surface area portions 8a and 8b extending eccentrically relative to the outer surface of the middle portion. The radii R3 and R4 of inner surface area portions 8a and 8b are unequal. The center points of radii R3 and R4 are located in plane 6 on both sides of axis 4 at different distances therefrom. The eccentricity E1 of radius R3 facing away from sleeve 2c is greater than the eccentricity E2 of radius R4, so that the two inner surface area portions 8a, 8b are arranged with different eccentricities.

The middle portion 3 has the thinnest wall thickness S1 at the point where the middle portion 3 intersects plane 6 and increases continuously from this point until it reaches a wall thickness S2 which corresponds to the difference between the radii R1–R3. The ratio S2/S1 is preferably 1.2 to 1.3.

The connecting surface 9 between the two inner surface area portions 8a, 8b fomed by radii R3 and R4 is a plane, narrow surface.

As can also be seen in FIG. 3, a connecting portion 10 of branch sleeve 2c and middle portion 3 is constructed so as to conically widen, so that the outer diameter D2 in the region of the inner sleeve end is greater than the outer diameter D1=2×R1 of the middle portion 3, wherein the wall thickness S3 of the middle portion 3 is greater than the wall thickness S2 and has a magnitude of about 1.34 to 1.4 times the wall thickness S1.

The middle portion 3 constructed in the manner described above has a wall thickness which increases continuously, wherein the wall thickness further increases in connecting portion 10 toward branch sleeve 2c, so that the areas subjected to greatest stress are reinforced as required without step-like changes of the wall thickness, with the outer surface of the member being smooth.

The outer circumference 11 of sleeves 2a, 2b is constructed so as to become conically smaller starting from the outer diameter D1 of middle portion 3 toward the insertion end 12. The outer circumference of the branch sleeve 2c starts to become conically narrower starting at the connecting portion 10 which has the greatest diameter D2. Each sleeve 2a, 2b, 3b has a cylindrical seat portion 13 for receiving a pipe 15 having an outer or nominal diameter d. Each sleeve portion has at its inner end a stop surface 14. Each cylindrical seat portion 13 has at the insertion end 12 a slightly conical or arched widening area which facilitates the insertion of a pipe.

Figure 5:
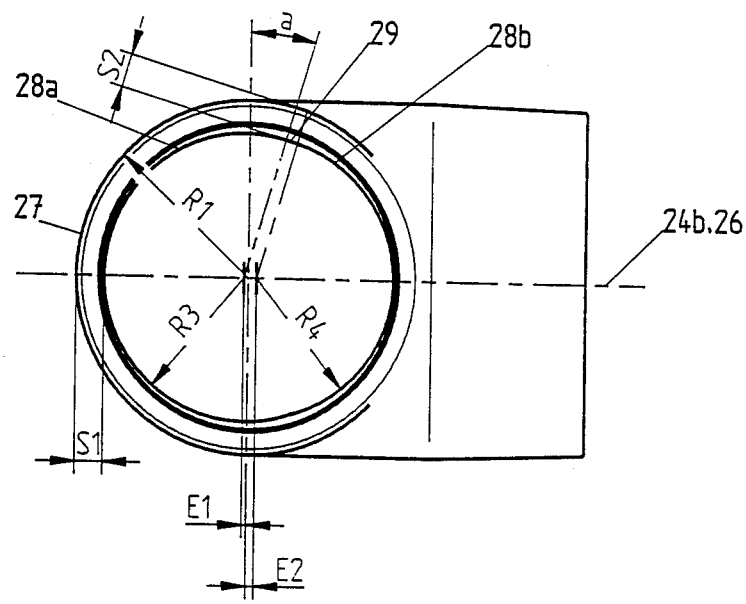
FIG. 5 is a top view of the member of FIG. 4.

FIGS. 4 and 5 of the drawing illustrate an angular pipe connecting member 21 according to the present invention. The angular member 21 includes a 90° angle, however, an angular member including a 45° angle may also be provided. The shape of the two sleeve portions 22a and 22b correspond to the sleeve portions 2a and 2b already described in connection with T-type pipe connecting member 1.

The two sleeve axes 24a and 24b are connected to each other by an arched center line 25 of the middle portion, wherein a plane extending through sleeve axes 24a, 24b and center line 25 is denoted with reference numeral 26.

The outer surface 27 of the middle portion 2 is constructed circular in cross-section with a radius R1, wherein the center point of radius R1 is located on center line 25.

The inner surface 28 has two inner surface area portions 28a, 28b which extend eccentrically relative to the outer surface. The radii R3 and R4 of inner surface area portions 28a, 28b are preferably of different magnitude, with the outwardly directed radius R3 being slightly larger. The center points of the radii are located in plane 26 on both sides of center line 25 at different distances therefrom, wherein the eccentricity E1 of the outwardly directed radius R3 is smaller than the eccentricity E2 of radius R4. The size of the inner surface area portion 28a in circumferential direction exceeds an angle of 180°, i.e., U=180°+2α. In the 90° angular pipe connecting member, α is about 15° to 16°, and in the 45° pipe connecting member, α is about 5° to 6°.

The pipe connecting member has its greatest wall thickness S2 at the transition between the inner surface area portion 28a and the inner surface area portion 28b, with the connection being formed by a narrow, plane connecting surface 29. The wall thickness S2 is 1.18 to 1.25 times the smallest wall thickness S1 in the outer region where the wall of middle portion 23 is intersected by plane 26.

As a result of the above-described eccentric shape of the inner surface 28, the middle portion of the angular pipe connecting member is reinforced to the greatest extent in the area which is subjected to forces which a use buckling. This is of particular importance with respect to the injection molding process used for manufacturing the pipe connecting member according to the present invention.

Since the maximum required wall thickness S2 is 1.3 times the smallest wall thickness S1 of the middle portion, and since the reinforcement is provided continuously at the inner surface, a substantial amount of material is saved as compared to pipe connecting members manufactured in the past, and the shape of the pipe connecting member is particularly suitable for injection molding with the outer surfaces of the member being smooth.

The wall thickness ratios described above were determined by mathematical computations by means, for example, of the finite element method, and by experimentations.

While specific embodiments of the invention have been shown and described in detail to illustrate the application of the inventive principles, it will be understood that the invention may be embodied otherwise without departing from such principles.

I claim:

1. A pipe connecting member of plastics material for pressurized fluid lines, the pipe connecting member having sleeve portions and a middle portion extending between and connecting the sleeve portions, the sleeve portions adapted to receive in a tightly sealed manner the pipes to be connected, the middle portion having an outer surface circular in cross-section, the improvement which comprises that the middle portion has a wall thickness which changes continuously in circumferential direction, the middle portion having an inner surface with two inner surface area portions, the inner surface area portions extending eccentrically relative to the outer surface of the middle portion wherein the center points of the radii of the inner surface area portions are located on both sides of the center point of the radius of the outer surface and ar located in a plane which extends through all sleeve axes, the smallest wall thickness of the middle portion being located in this plane.

2. The pipe connecting member according to claim 1, wherein the greatest wall thickness of the middle portion is 1.18 to 1.3 times the smallest wall thickness.

3. The pipe connecting member according to claim 1, the pipe connecting being a T-type connecting member for connecting three pipes having the same outer diameters, wherein the branch sleeve portion has at the inner end thereof an outer diameter which is greater than the outer diameter of the middle portion, and wherein the wall thickness of the branch sleeve portion is greater than the greatest wall thickness of the middle portion.

4. The pipe connecting member according to claim 3, wherein the radii of the two inner surface area portions are equal bet extend with different eccentricities relative to the outer surface, the outwardly arranged radius more remote from the branch sleeve portion having a greater eccentricity than the radius directed toward the branch sleeve portion.

5. The pipe connecting member according to claim 1, the pipe connecting member being an angular member having an outwardly facing wall portion, the radius of the inner surface area portion directed toward the outer wall portion being greater than the inwardly directed radius, the eccentricity of the outer radius being smaller than the eccentricity of the inner radius.

6. The pipe connecting member according to claim 5, wherein the circumferential length of the inner surface area portion formed by the outwardly directed radius is greater than 180°.

7. The pipe connecting member according th claim 6, the pipe connecting member being a 90° angular member, the circumferential length of the inner area portion formed by the outwardly directed radius being 210° to 215°.

8. The pipe connecting member according to claim 6, the pipe connecting member being a 45° angular member, the circumferential length of the inner surface area formed by the outwardly directed radius being 190° to 192°.

9. The pipe connecting member according to claims 3 or 5, wherein each sleeve portion has an insertion end, the outer surface of each sleeve portion being of conically narrowing shape toward the insertion end, and wherein the inner surface of each sleeve portion defines a stop surface.

10. The connecting member according to claim 9, wherein the insertion end is configured to widen conically.

11. The pipe connecting member according to claim 9, wherein the insertion end is configured to widen in the shape of an arch.

* * * * *